United States Patent Office 3,639,445
Patented Feb. 1, 1972

3,639,445
PROCESS FOR MAKING SUBSTITUTED CROTONATES
Chester E. Pawloski, Bay City, Mich., assignor to The Dow Chemical Company, Midland, Mich.
No Drawing. Filed Jan. 8, 1968, Ser. No. 696,158
Int. Cl. C07c *69/66*
U.S. Cl. 260—473 A    3 Claims

ABSTRACT OF THE DISCLOSURE

Esters of crotonic acid having an ether substituent in the 3-position are prepared by reacting an acetoacetic ester with an acetal under acid esterification conditions whereby low boiling reaction byproducts are distilled from the reaction mixture substantially as they are formed.

BACKGROUND OF THE INVENTION

This invention relates to an improved process for converting a keto ester to an ether of the corresponding enol. It relates particularly to a method for making esters of crotonic acid having an ether substituent in the 3-position of the acid molecule.

Crotonic acid esters of this general structure and particularly esters of 3-alkoxy-crotonic acid are of interest as intermediates for making certain naturally occurring narcotics. They have been prepared in the past by reacting an alkali metal alkoxide with an ester of 3-chlorocrotonic acid. The relative unavailability of the ester and the small yields usually obtained make this method of only laboratory interest. Such alkoxycrotonates have also been made by reacting an alcohol with an acetoacetic ester in the presence of a strong acid catalyst, preferably distilling water of reaction from the mixture as it is formed, for example, by azeotropic distillation. The reaction is recommended to be carried to only partial completion for best results. While this method is useful for making some alkoxycrotonate esters, it is not suitable for making such esters wherein the esterifying alcohol is substantially lower boiling than the alcohol corresponding to the ether substituent because of alcoholysis in the course of the reaction and distillation of the lower boiling alcohol from the reaction mixture.

SUMMARY OF THE INVENTION

It has now been found that esters of ether substituted crotonic acid of the formula

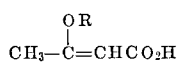

are conveniently prepared by reacting the corresponding ester of acetoacetic acid (of the formula $$CH_3COCH_2CO_2R'$$)

with an acetal of the alcohol ROH in the presence of an acidic esterification catalyst and under such conditions of temperature and pressure that at least the alcohol and preferably also the aldehyde or ketone byproduct of the reaction is distilled from the mixture substantially as formed. The term acetal is used herein to define an acetal or ketal derived from an aldehyde or ketone of at least 2 carbon atoms. Formals are excluded, for, surprisingly, these are not operable in the present process. In the above formulas, R can be the residue of any primary or secondary monohydric alcohol having a boiling point below that of the crotonic ester product and R' is the residue of any esterifiable organic hydroxy compound and is preferably a hydrocarbon group. The reaction is illustrated by the equation:

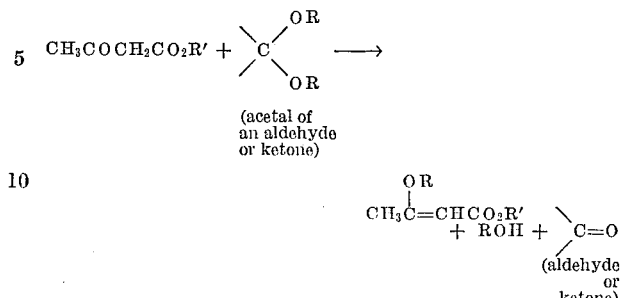

DETAILED DESCRIPTION

Preferably the acetal reactant is the acetal of an aliphatic aldehyde or ketone of 2–8 carbon atoms and has the formula:

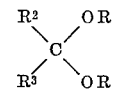

wherein $R^2$ is alkyl of 1–4 carbon atoms, or haloalkyl of 1–4 carbon atoms, $R^3$ is hydrogen or $R^2$, and R is a primary or secondary radical such as an alkyl radical of 1–2 carbon atoms, a haloalkyl radical of 2–4 carbon atoms, an alkenyl radical of 3–4 carbon atoms, an alkynyl radical of 3–4 carbon atoms, or a benzyl radical. $R^2$ and $R^3$ are most conveniently both methyl groups or one is a methyl group and the other is a hydrogen atom.

The radical R' can be any organic radical as noted above but it is most suitably a hydrocarbon group of 1–10 carbon atoms such as an alkyl radical of 1–8 carbon atoms, an aralkyl radical of 7–9 carbon atoms such as benzyl, phenethyl, or α-ethylbenzyl, or an aromatic radical of 6–10 carbon atoms such as phenyl, tolyl, butylphenyl, or the like.

Any strong acid esterification catalyst is operative in the process. Preferably it is substantially nonvolatile under process conditions. Acid catalysts such as sulfuric acid, phosphoric acid, toluenesulfonic acid, acid-treated clays, and the like are illustrative. Only a catalytic quantity of acid is necessary.

The proportions of acetal and acetoacetic ester are not critical to success of the reaction, but it is ordinarily convenient to use at least one mole of acetal per mole of acetoacetic ester and 1–5 moles of acetal is usually preferred.

The operable temperature and pressure depends upon the particular acetal employed and consequently upon the alcohol and aldehyde or ketone byproducts which are liberated and distilled from the reaction mixture. Process temperatures are preferably within the range 50–200° C.

The process of the present invention is typically operated by combining a mole of acetoacetic ester with 1–2 moles of an acetal of acetone or acetaldehyde and a catalytic amount of an esterification acid catalyst, heating the reaction mixture to a temperature sufficient to distill off the alcohol and carbonyl compound byproducts at atmospheric pressure or reduced pressure, depending upon the boiling points of these byproducts, and continuing this procedure until the reaction is substantially complete. The ether-substituted crotonic ester product is then separated from the reaction residue by any convenient means such as crystallization or distillation, preferably the latter. In that case it is usually desirable to neutralize the acid catalyst before further heating.

The ether-substituted crotonic acid esters prepared by this process are valuable intermediates which can be used in synthesizing the narcotic kawain and related compounds having similar activity as shown by Klostermans, Rec. Trav. Chim. 70, 79–82 (1951). These esters also have biological activity themselves, being active vermicides which are effective against internal parasites such as mouse tapeworms and pig ascarids when fed to infected animals in concentrations of 0.01–0.1 percent in the diet.

EXAMPLE 1

A mixture of 232 g. of methyl acetoacetate, 416 g. of 2,2-dimethoxypropane, and a few drops of concentrated sulfuric acid was heated in a reaction flask equipped with a distillation column having a fractionating head at a temperature sufficient to distill the methanol and acetone byproducts from the reaction mixture. The final temperature of the residue was 103° C. The cooled residue was neutralized by addition of sodium carbonate and distilled under reduced pressure to obtain 64 percent of the theoretically obtainable yield of methyl 3-methoxycrotonate based on the starting methyl acetoacetate.

When this reaction procedure was repeated using methylal in place of dimethoxypropane, no reaction took place, the starting methylal and methyl acetoacetate remaining essentially unchanged.

EXAMPLE 2

Following the procedure of Example 1, 214 g. of 2,2-diethoxypropane was reacted with 104 g. of ethyl acetoacetate in the presence of concentrated sulfuric acid and the reaction mixture was distilled to obtain an 85 percent yield of ethyl 3-ethoxycrotonate.

EXAMPLE 3

A mixture of 33 g. of ethyl aceto acetate, 75 g. of the di(2-chloroethyl) acetal of acetone, and a drop of concentrated sulfuric acid was heated to a final pot temperature of 120° C. and a distillation head temperature of 72° C. at 95 mm. Hg, thereby distilling from the mixture the reaction byproducts ethylene chlorohydrin and acetone. The distillation residue was then neutralized with sodium carbonate and distilled at reduced pressure to obtain a 76 percent yield of ethyl 3-(2-chloroethoxy)crotonate, a white solid, B.P. 108° C. at 5 mm. Hg.

EXAMPLE 4

Essentially as shown in Example 1, a mixture of 46 g. of the diallyl acetal of acetone, 40 g. of ethyl acetoacetate, and a drop of concentrated sulfuric acid was heated to 130° C., neutralized, and distilled to obtain a 60% yield of ethyl 3-allyloxycrotonate, a colorless liquid, B.P. 70° C. at 4.5 mm. Hg.

EXAMPLE 5

By the procedure of Examples 1 and 4, equal molar quantities of ethyl acetoacetate and the dibutyl acetal of chloroacetone were reacted in the presence of sulfuric acid to obtain a 90% yield of ethyl 3-butoxycrotonate.

EXAMPLE 6

Following the general procedure of the foregoing examples, a mixture of 33 g. of ethyl acetoacetate, 75 g. of the dibenzyl acetal of chloroacetone, and a drop of concentrated sulfuric acid in 75 ml. of toluene was heated to a final pot temperature of 135° C. under reduced pressure, thereby distilling off relatively low boiling reaction byproducts, the final pressure within the system being 1.1 mm. Hg. The acid catalyst was then neutralized by addition of sodium carbonate to the reaction mixture and the mixture was distilled under reduced pressure to obtain an 86 percent yield of ethyl 3-benzyloxycrotonate based on a 63 percent conversion of the acetoacetic ester. The product was a clear viscous liquid, B.P. 111° C. at 0.6 mm. Hg.

In the same manner as shown by the above examples, the dipropargyl acetal of acetone is reacted with ethyl acetoacetate to obtain ethyl 3-propynyloxycrotonate, the diisopropoxy acetal of acetone is reacted with methyl acetoacetate to obtain methyl 3-isopropoxycrotonate, and the dihexyl acetal of acetaldehyde is reacted with phenyl acetoacetate to obtain phenyl 3-hexyloxycrotonate.

I claim:

1. A process for making an ester of an ether-substituted crotonic acid of the formula

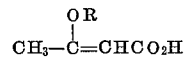

which comprises reacting an acetoacetic ester with an acetal of the formula

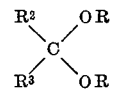

wherein $R^2$ is alkyl or haloalkyl of 1–4 carbon atoms, and $R^3$ is hydrogen or $R^2$ and R is a primary or secondary radical which is alkyl of 1–6 carbon atoms, haloalkyl of 2–4 carbon atoms, alkenyl of 3–4 carbon atoms, alkynyl of 3–4 carbon atoms, or benzyl, in the presence of an acid esterification catalyst at a temperature of 50–200° C. and at temperature and pressure conditions such that the alcohol byproduct of the reaction is distilled from the reaction mixture substantially as it is formed.

2. The process of claim 1 wherein the acetal is the acetal of acetaldehyde or acetone.

3. The process of claim 1 wherein the acetoacetic ester has the formula $CH_3COCH_2CO_2R'$ wherein R' is an alkyl radical of 1–8 carbon atoms, an aralkyl radical of 7–9 carbon atoms, or an aromatic hydrocarbon radical of 6–10 carbon atoms, and the acetal has the formula

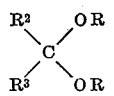

wherein R is as defined in claim 1, $R^2$ is an alkyl or haloalkyl radical of 1–4 carbon atoms, and $R^3$ is hydrogen or $R^2$.

References Cited

UNITED STATES PATENTS 3,027,401  3/1962  Reicheneder _____ 260—483

LORRAINE A. WEINBERGER, Primary Examiner

P. J. KILLOS, Assistant Examiner

U.S. Cl. X.R.

260—479 S, 484 R; 424—314